US012725506B2

(12) United States Patent
Ryd et al.

(10) Patent No.: US 12,725,506 B2
(45) Date of Patent: Sep. 1, 2026

(54) ALERTING A DIFFERENCE IN USER SENTIMENT OF A USER USING A DOOR

(71) Applicant: ASSA ABLOY AB, Stockholm (SE)

(72) Inventors: Gustav Ryd, Stockholm (SE); Matthaios Stylianidis, Hägersten (SE)

(73) Assignee: ASSA ABLOY AB, Stockholm (SE)

( * ) Notice: Subject to any disclaimer, the term of this patent is extended or adjusted under 35 U.S.C. 154(b) by 9 days.

(21) Appl. No.: 18/832,617

(22) PCT Filed: Feb. 3, 2023

(86) PCT No.: PCT/EP2023/052654
§ 371 (c)(1),
(2) Date: Jul. 24, 2024

(87) PCT Pub. No.: WO2023/148314
PCT Pub. Date: Aug. 10, 2023

(65) Prior Publication Data
US 2025/0148897 A1 May 8, 2025

(30) Foreign Application Priority Data
Feb. 4, 2022 (SE) .................................. 2250108-4

(51) Int. Cl.
*G06V 20/52* (2022.01)
*G08B 21/18* (2006.01)
(Continued)

(52) U.S. Cl.
CPC .............. *G08B 21/18* (2013.01); *G06V 10/82* (2022.01); *G06V 20/52* (2022.01); *G06V 40/10* (2022.01); *G10L 15/16* (2013.01); *G10L 15/1815* (2013.01)

(58) Field of Classification Search
CPC ..... G10L 15/16; G10L 15/1815; G10L 15/00; G10L 25/51; G10L 25/66; G08B 21/18;
(Continued)

(56) References Cited

U.S. PATENT DOCUMENTS 9,760,913 B1 9/2017 Allen et al.
10,964,130 B1 * 3/2021 Dixit .................. G05B 23/0283
(Continued)

FOREIGN PATENT DOCUMENTS

| | | |
|---|---|---|
| CN | 106778699 | 5/2017 |
| WO | 2018080536 | 5/2018 |
| WO | 2023148314 | 8/2023 |

OTHER PUBLICATIONS

"PCT EP 2023052654 IPRP mailed Jun. 3, 2024", 20 pages.
(Continued)

*Primary Examiner* — Dionne Pendleton
(74) *Attorney, Agent, or Firm* — Schwegman Lundberg & Woessner, P.A.

(57) ABSTRACT

A method for alerting difference in user sentiment of a user using a door. The method is performed in a user analysis device. The method comprises: receiving sensor data from at least two sensors of different sensor types, the sensor data comprising data relating to a user in the vicinity of a door; determining, based on the sensor data, a first user sentiment prior to using the door; determining, based on the sensor data, a second user sentiment after using the door; deriving a difference in user sentiment between the first user sentiment and the second user sentiment; detecting that the difference in user sentiment is greater than a threshold; and generating an alert signal, indicating that the difference in user sentiment is greater than the threshold.

13 Claims, 2 Drawing Sheets

(51) Int. Cl.
*G06V 10/82* (2022.01)
*G06V 40/10* (2022.01)
*G10L 15/16* (2006.01)
*G10L 15/18* (2013.01)

(58) Field of Classification Search
CPC .... G08B 21/0205; G06V 10/82; G06V 20/52; G06V 40/10; G06V 40/176; G06V 10/145; G06V 40/172; G06V 10/141; G06V 10/761; G06V 20/56; G06V 40/16; G06V 40/40; G06V 10/764; G06V 20/10; G06V 20/46; G06V 20/53; G06V 20/58; G06V 2201/07; G06V 40/103; G06V 40/165; G06V 40/167; G06V 40/168; G06V 40/169; G06V 40/171; G06V 40/178; G06V 40/18; G06V 40/20; G06V 20/584; G06V 10/255; G06V 10/26; G06V 10/62; G06V 10/70; G06V 10/774; G06V 10/87; G06V 10/94; G06V 10/96; G06V 20/64; G06V 10/225; G06V 10/25; G06V 10/454; G06V 10/462; G06V 10/803; G06V 20/582; G06V 20/95; G06V 30/10; G06V 30/19173; G06V 30/20; G06V 30/40; G06V 30/422; G06V 40/113; G06V 40/23; G06V 40/25; G06V 40/28; G06F 16/51; G06F 18/2136; G06F 18/214; G06F 18/217; G06F 18/22; G06F 2218/10; G06F 2218/12; G06F 16/00; G06F 16/24575; G06F 21/6263; G06F 11/36; G06F 17/16; G06F 3/017; G06F 8/77; G06F 9/453; G06F 18/2148; G06F 18/24; G06F 18/2413; G06F 18/285; G06F 40/30; G06F 16/739; G06F 16/75; G06F 16/7867; G06F 17/15; G06F 18/2415; G06F 18/2433; G06F 18/251; G06F 21/577; G06F 2221/034; G06F 40/216; G06F 40/295; G05D 1/0016; G05D 1/0212; G05D 1/0242; G05D 1/0246; G05D 1/12; G05D 1/0088; G05D 1/24; G05D 1/0231; G05B 23/024; G05B 23/0254; G05B 23/0283; G05B 13/027; G05B 2219/33056; G05B 2219/39391; G05B 2219/40499; G05B 2219/42152; G01C 21/206; G01C 21/3407; G01C 21/3446; G01C 21/3453; G01C 21/3484; G01C 21/3605; B60Q 1/02; H04N 23/20; H04N 23/50; H04N 23/56; H04N 25/20; H04N 5/2621; H04N 7/141; H04N 7/147; H04N 5/2628; G06T 2207/10016; G06T 2207/10048; G06T 2207/20081; G06T 2207/20084; G06T 2207/30244; G06T 7/11; G06T 7/514; G06T 7/74; G06T 2207/20076; G06T 2207/30196; G06T 2207/30201; G06T 2207/30241; G06T 2207/30242; G06T 2207/30252; G06T 7/12; G06T 7/136; G06T 7/20; G06T 7/246; G06T 7/70; G06T 7/73; G06T 2207/30261; G06T 2207/30236; G06T 7/174; G06T 15/00; G06T 17/20; G06T 19/00; G06T 2207/20132; G06N 3/045; G06N 3/0464; G06N 3/08; G06N 3/09; G06N 3/048; G06N 3/0495; G06N 3/084; G06N 3/02; G06N 3/04; G06N 3/044; G06N 3/0442; G06N 3/0455; G06N 3/0499; G06N 3/082; G06N 20/00; G06N 3/088; G06N 3/0895; G06N 3/096; G06N 3/094; G06N 3/008; G06N 3/0475; G06N 3/049; G06N 3/091; G06N 3/092; G06N 3/098; G06N 3/0985; G06N 7/01; G01B 11/14; G01B 11/2513; G01D 9/00; G06Q 20/04; G06Q 30/02; G06Q 30/0609; G06Q 30/08; G06Q 40/03; G06Q 40/08; G06Q 50/00; G06Q 10/0635; G06Q 10/06398; G06Q 30/0282; B60C 11/246; B60C 19/00; B60C 2019/006; B60C 23/04; B60C 23/0491; B60C 23/061; B60C 99/006; A61B 2562/0204; A61B 5/0022; A61B 5/02438; A61B 5/0816; A61B 5/0823; A61B 5/165; A61B 5/4803; A61B 5/4833; A61B 5/4842; A61B 5/6898; A61B 7/003; B60W 40/08; B60W 2050/0075; B60W 2420/403; B60W 2540/041; B60W 2554/4029; B60W 2554/80; B60W 2556/45; B60W 30/09; B60W 30/18159; B60W 30/18163; B60W 60/001; B60W 60/0017; B60W 60/0018; B60W 60/0027; B64F 5/40; B64F 5/60; G01S 13/5246; G01S 7/023; G01S 7/2927; G01S 7/4013; G01S 17/58; G01S 17/89; G01S 17/931; G07C 5/0808; G07C 9/30; Y02P 70/50; G16H 20/70; G16H 40/63; G16H 40/67; G16H 50/20; G09B 19/00; E05F 15/71; E05F 15/77; E05F 15/73; E05F 2015/767; E05Y 2400/447; E05Y 2900/542; E05Y 2900/55; E05Y 2900/132; B01D 2201/56; B01D 35/143; B01D 35/1435; B01D 35/1573; B25J 9/1697; B65D 90/008; B65D 90/48; G11B 27/031; G11B 27/102; G01P 13/00; G01M 3/38; D06F 37/28; C02F 1/003; C02F 1/008; C02F 2201/006; C02F 2209/008; C02F 2209/40; C02F 2307/10; C02F 2307/12
See application file for complete search history.

(56) References Cited

U.S. PATENT DOCUMENTS

| | | | |
|---|---|---|---|
| 11,010,726 B2 | 5/2021 | Sueyoshi et al. | |
| 11,919,337 B2 * | 3/2024 | Alleva | B60C 23/0491 |
| 2016/0302711 A1 | 10/2016 | Frank et al. | |
| 2017/0330160 A1 * | 11/2017 | Sueyoshi | G06Q 40/08 |
| 2019/0087650 A1 | 3/2019 | Takagi | |
| 2021/0012371 A1 | 1/2021 | Bikumala et al. | |
| 2021/0397824 A1 | 12/2021 | Mishra et al. | |

OTHER PUBLICATIONS

"PCT EP 2023052654 Written Opinion mailed Mar. 14, 2023", 7 pages.
"PCT EP 2023052654 ISR Mar. 14, 2023", 6 pages.
"Patent application No. 2250108-4 Swedish Final Notice mailed Sep. 12, 2022", 24 pages.

* cited by examiner

ALERTING A DIFFERENCE IN USER SENTIMENT OF A USER USING A DOOR

CROSS-REFERENCE TO RELATED APPLICATION(S)

This application is a national stage application under 35 U.S.C. § 371 of PCT Appl. No. PCT/EP2023/052654, titled "Alerting a Difference in User Sentiment of a User Using a Door," filed Feb. 3, 2023, which claims priority to Swedish Patent Appl. No. 2250108-4, filed Feb. 4, 2022, each of which is incorporated herein by reference in its entirety.

TECHNICAL FIELD

The present disclosure relates to the field of door environments and in particular to alerting a difference in user sentiment of a user using a door.

BACKGROUND

Doors are prevalent in modern life. Doors are provided to enter buildings, to transition between spaces of a building or between outside spaces, etc.

There are known ways to monitor the status and operation of a door, e.g. by collecting data power use etc.

However, it would be of great use if there would be another way to evaluate door operation, which is not dependent on complicated power monitoring.

SUMMARY

One object is to provide an improved way to evaluate door operation.

According to a first aspect, it is provided a method for alerting difference in user sentiment of a user using a door. The method is performed in a user analysis device. The method comprises: receiving sensor data from at least two sensors of different sensor types, the sensor data comprising data relating to a user in the vicinity of a door; determining, based on the sensor data, a first user sentiment prior to using the door; determining, based on the sensor data, a second user sentiment after using the door; deriving a difference in user sentiment between the first user sentiment and the second user sentiment; detecting that the difference in user sentiment is greater than a threshold; and generating an alert signal, indicating that the difference in user sentiment is greater than the threshold.

The user sentiment may be represented by a plurality of sentiment scores, wherein each sentiment score indicates an estimated extent of a particular emotion of the user.

The detecting that the difference in user sentiment is greater than a threshold may comprises comparing the difference in user sentiment to a baseline difference in user sentiment when a door is used.

The deriving a difference in user sentiment may comprise calculating an average difference of a sliding window function applied to user sentiment differences for users using the door.

The sensor data may comprise at least two of: image data from a camera, audio data from a microphone and depth imaging data.

The method may further comprise: balancing, based on the alert signal, a door kinematic operation between limiting door opening to save energy and extending door opening for improved user experience.

The alert signal may indicate a need for reparation or maintenance of the door.

According to a second aspect, it is provided a user analysis device for alerting difference in user sentiment of a user using a door. The user analysis device may comprise: a processor; and a memory storing instructions that, when executed by the processor, cause the user analysis device to: receive sensor data from at least two sensors of different sensor types, the sensor data comprising data relating to a user in the vicinity of a door; determine, based on the sensor data, a first user sentiment prior to using the door; determine, based on the sensor data, a second user sentiment after using the door; derive a difference in user sentiment between the first user sentiment and the second user sentiment; detect that the difference in user sentiment is greater than a threshold; and generate an alert signal, indicating that the difference in user sentiment is greater than the threshold.

Each sentiment score may indicate an estimated extent of a particular emotion of the user.

The instructions to detect that the difference in user sentiment is greater than a threshold may comprise instructions that, when executed by the processor, cause the user analysis device to compare the difference in user sentiment to a baseline difference in user sentiment when a door is used.

The instructions to derive a difference in user sentiment may comprise instructions that, when executed by the processor, cause the user analysis device to calculate an average difference of a sliding window function applied to user sentiment differences for users using the door.

The sensor data may comprise at least two of: image data from a camera, audio data from a microphone and depth imaging data.

The user analysis may further comprise instructions that, when executed by the processor, cause the user analysis device to: balance, based on the alert signal, a door kinematic operation between limiting door opening to save energy and extending door opening for improved user experience.

The alert signal may indicate a need for reparation or maintenance of the door.

According to a third aspect, it is provided a computer program for alerting difference in user sentiment of a user using a door. The computer program comprises computer program code which, when executed on a user analysis device causes the user analysis device to: receive sensor data from at least two sensors of different sensor types, the sensor data comprising data relating to a user in the vicinity of a door; determine, based on the sensor data, a first user sentiment prior to using the door; determine, based on the sensor data, a second user sentiment after using the door; derive a difference in user sentiment between the first user sentiment and the second user sentiment; detect that the difference in user sentiment is greater than a threshold; and generate an alert signal, indicating that the difference in user sentiment is greater than the threshold.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide a way of not only exploiting detection of user sentiment, but exploiting a difference in user sentiment. In particular, this difference in user sentiment is applied for before and after a user passing through a door. When the difference is significant, an alert is generated. This alert signal can then be used for a variety of purposes, e.g. for detecting when the door needs repair or maintenance, or for when door kinematics need to be adjusted.

Figure 1:
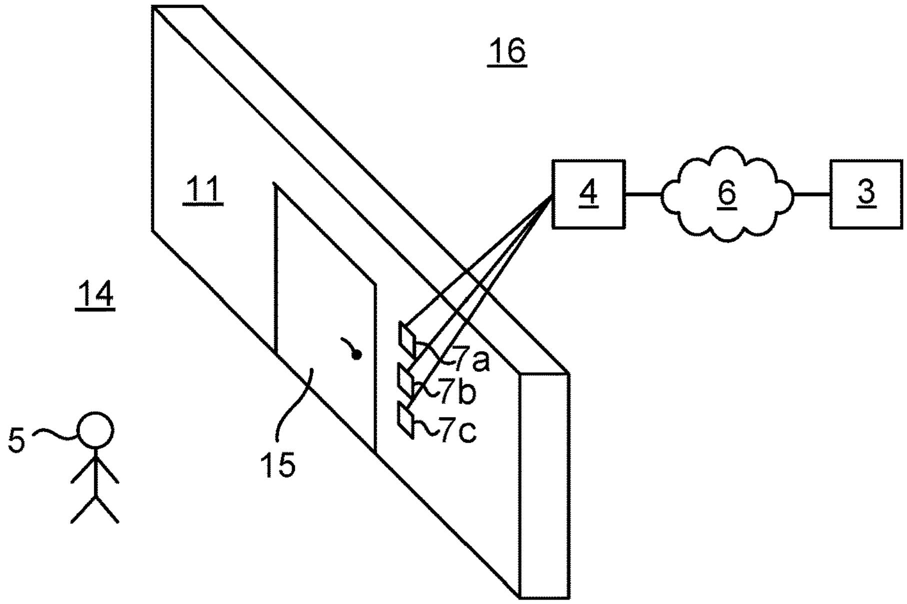
FIG. 1 is a schematic diagram illustrating an environment in which embodiments presented herein can be applied.

FIG. 1 is a schematic diagram illustrating an environment in which embodiments presented herein can be applied. Access to a restricted physical space 16 is restricted by a door 15. The door 15 stands between the restricted physical space 16 and an accessible physical space 14. The restricted physical space 16 is inside the door 15 and the accessible physical space 14 is outside the door 15. The door 15 could also be implemented as a gate, turnstile, hatch, window door, etc. In order to unlock or lock the door 15, an electronic lock (not shown) is optionally provided. The door 15 is provided in a surrounding fixed structure 11, such as a wall or fence.

A user 5 is in the vicinity of the door 15. A plurality of sensors 7*a*-*c* are provided to collect sensor data relating to the user 5 in the vicinity of the door 15. For instance a first sensor 7*a* can be in the form of a camera, capturing image data of the user 5. A second sensor 7*b* can be in the form of a microphone, capturing audio data of the user 5. A third sensor 7*c* can be in the form of a lidar, radar, time-or-flight sensor or other depth measuring capable device, capturing depth imaging data of the user 5.

Optionally, one or more sensors are provided on the inside of the door 15, i.e. in the restricted physical space 16 to improve an ability to capture sensor data of the user 5 also on the inside.

Sensor data from the sensor is transmitted to a local device 4. The local device 4 is a device that is provided locally, i.e. in the same location as the door 15 and the sensors 7*a*-*c*. The sensor data from the sensors 7*a*-7*c* is collected by the local device 4. Optionally, the local device 4 is also used for other functions, such as for access evaluation of an electronic lock, alarm system, etc.

The local device 4 optionally contains communication capabilities to connect via a network 6 to a server 3. The network 7 can be a wide area network, such as the Internet, to which local device 4 can connect e.g. via Ethernet, Wi-Fi (e.g. any of the IEEE 802.11x standards) or a cellular network, such as LTE (Long Term Evolution), next generation mobile networks (fifth generation, 5G), UMTS (Universal Mobile Telecommunications System) utilising W-CDMA (Wideband Code Division Multiplex), etc.

The server 3 can be provided in a remote location, and can be implemented as a single physical device or distributed over multiple physical devices. The server 3 can be implemented in what is commonly referred to as 'the cloud'.

According to embodiments presented herein, the sensors are used to allow the determination of a first sentiment of the user 5, prior to using the door 15 and a of second sentiment of the user 5, after using the door 15. A difference is determined between the two sentiments, and it is then determined whether the difference is significant, in which case this is alerted, indicating an operating state of the door. This processing is performed by a user analysis device, and is described in more detail below.

Figure 2A:
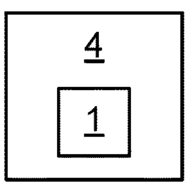
FIGS. 2A-C are schematic diagrams illustrating embodiments of where the user analysis device can be implemented.
Figure 2B:
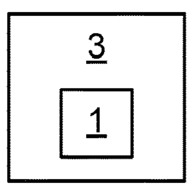
Figure 2C:
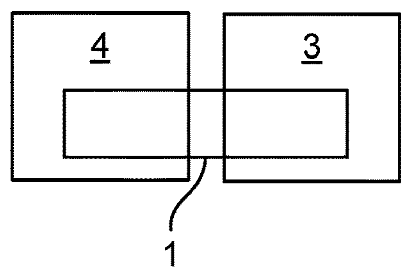

FIGS. 2A-C are schematic diagrams illustrating embodiments of where the user analysis device can be implemented.

In FIG. 2A, the user analysis device 1 shown implemented in the local device 4. The local device 4 is thus the host device for the user analysis device 1 in this implementation.

In FIG. 2B, the user analysis device 1 shown implemented in the server 3. The server 3 is thus the host device for the user analysis device 1 in this implementation.

In FIG. 2C, the user analysis device 1 shown implemented partly in the local device 4 and partly in the server 3. In this implementation, both the local device 4 and the server 3 device act as host devices for (different parts of) the user analysis device 1.

Figure 3:
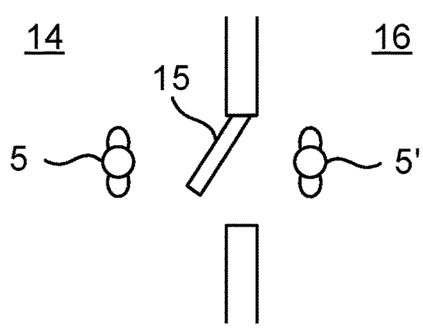
FIG. 3 is a schematic top view illustrating when a user passes through the door.

FIG. 3 is a schematic top view illustrating when a user 5 passes through the door 15. At a first time, prior to using the door 15, the user 5 is on the outside of the door 15. At a second time, the translated user 5' has moved to the inside of the door 15. As explained in more detail below, the sentiment of the user is captured both prior to and after using the door, to generate an alert when a difference in sentiment is significant. It is to be noted that the use of the door can also be when the user passes in either direction, i.e. from the outside 14 to the inside or from the inside 16 to the outside 14.

Figure 4:
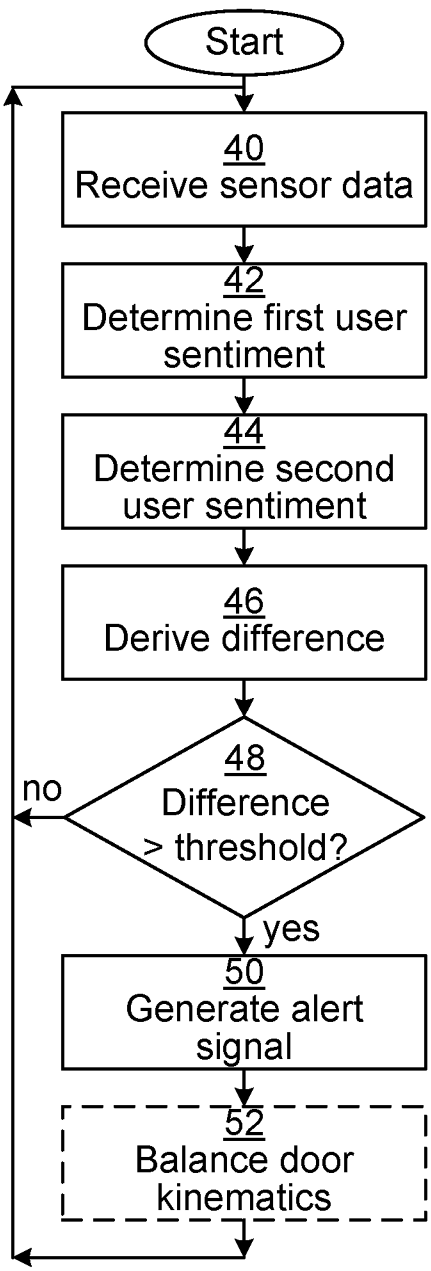
FIG. 4 is a flow chart illustrating embodiments for alerting difference in user sentiment of a user using a door.

FIG. 4 is a flow chart illustrating embodiments for alerting difference in user 5 sentiment of a user using a door 15. The method is performed in a user analysis device 1.

In a receive sensor data step 40, the user analysis device 1 receives sensor data from at least two sensors 7*a*-*c* of different sensor types. The sensor data comprises data relating to a user 5 in the vicinity of a door 15. Vicinity can be defined as being near enough such that the user 5 can be sensed by the sensors.

In one embodiment, the sensor data comprises at least two of: image data from a camera, audio data from a microphone and depth imaging data. All of these types of data can be great indicators of sentiment.

In a determine first user sentiment step 42, the user analysis device 1 determines, based on the sensor data, a first user sentiment prior to using the door 15. The first user sentiment can e.g. be determined using the ML model described below.

In a determine second user sentiment step 44, the user analysis device 1 determines, based on the sensor data, a second user sentiment after using the door 15. The second user sentiment can e.g. be determined using the ML model described below.

The first and second user sentiments can be represented by a plurality of sentiment scores, wherein each sentiment score indicates an estimated extent of a particular emotion of the user. For instance, there can be separate sentiment scores (e.g. as percentages) for happiness, anger, sadness, frustration, etc.

The first and second user sentiments can be derived based on a machine learning (ML) model (e.g. in the form of an artificial neural network with the different sensor data provided as inputs, and the sentiment scores are outputs). The ML model can be trained on labelled data where a user is monitored using the sensors. After the monitoring, the user indicates her/his true emotions, which then act as labels for using the sensor data of the users for training the ML model.

In a derive difference step 46, the user analysis device 1 derives a difference in user sentiment between the first user sentiment and the second user sentiment. The difference can e.g. be based on component differences in each of the sentiment scores, reflected as a set or vector of the calculated component differences. Optionally, the component differences are combined in an aggregate difference, where a positive value can indicate a general improvement in sentiment and a negative value can indicate a general deterioration in sentiment. The aggregate difference can be calculated as a sum of weighted component differences, where the different component differences can be multiplied with different weights. Alternatively, component differences can be aggregated in multiple aggregate differences, e.g. a negative emotion aggregate difference and a positive emotion aggregate difference.

The magnitude of the aggregate difference can indicate the extent of improvement/deterioration.

The difference can be calculated as an average difference of a sliding window function applied to user sentiment differences for all users using the door 15. In this way, the difference is does not change dramatically if a particular user reacts stronger in sentiment than most other users.

In a conditional difference>threshold step 48, the user analysis device 1 evaluates whether the difference in user sentiment is greater than a threshold. In one embodiment, the difference needs to indicate a deterioration in sentiment greater than a threshold for this evaluation to indicate that the difference in user sentiment is greater than a threshold.

This evaluation can e.g. comprise comparing the difference in user sentiment to a baseline difference (thus being the threshold) in user sentiment when a door 15 is used, e.g. by comparing each component difference, e.g. in a vector, with a corresponding baseline component difference (i.e. threshold), i.e. for the corresponding emotion. It can be sufficient that a predefined number of component differences have a difference greater than a respective threshold. More complex rules could also be applied, such as: at least x component differences must be greater than their respective threshold, of which one must be a particular component difference. Alternatively or additionally, the (one or more) aggregate differences can be used for the evaluation. The baseline can be based on data from other doors set up in similar environments, in order to mitigate effects of external factors on multiple users, such as holiday events, weather, etc.

The evaluation can alternatively or additionally be based on a sudden deterioration in the sentiment difference. The evaluation can alternatively or additionally be based on several consecutive less significant deteriorations (for different users for the same door) over time.

In a generate alert signal step 50, the user analysis device 1 generates 50 an alert signal, indicating that the difference in user sentiment is greater than the threshold.

The alert signal can e.g. indicate a need for reparation or maintenance of the door 15. For instance, if the door is jamming, this results in a slight deterioration in user sentiment. The same would occur for other slight or major malfunctions of the door. In this way, a better user experience is provided, due to the faster detection of misconfigurations or malfunctions, Moreover, repair costs and downtime is reduced if malfunctioning is detected before product breaks down.

In an optional balance door kinematics step 52, the user analysis device 1 balances, based on the alert signal, a door kinematic operation between limiting door opening to save energy and extending door opening for improved user experience. For instance a door closer can be configurable in its door closing speed or timing of door closing. Optionally, this determination is also based on weather data, obtained from local sensors and/or from online weather observation/forecasting services. On the one hand, it is beneficial to be aggressive in the door closing, closing the door faster and/or at an earlier time, to thereby save energy due to air escaping from the inside that has been heated or cooled. On the other hand, it is beneficial to be lenient in the door closing to allow a user to pass through the door without feeling stressed or pressured by a closing door. Using the difference in user sentiments, when an increase in frustration or other negative sentiment is detected for one or more users passing through the door, this indicates that the door closing is too aggressive, whereby the door kinematics are adjusted to be more lenient. On the other hand, if all users show no sentiment deterioration when using the door, the door kinematics can be nudged to be slightly more aggressive to save energy.

The embodiments presented herein are based on evaluating sensor data of a user to determine when a user sentiment difference (between before and after using a door) is greater than a threshold. This user sentiment difference is exploited to determine operational characteristics of the door. For instance, a significant deterioration in user sentiment when the door is used can indicate a malfunctioning or poorly functioning door, requiring maintenance or repair. Alternatively or additionally, a significant deterioration in user sentiment when the door is used can indicate that a door closing mechanism is too aggressive, which results in a poor user experience.

Figure 5:
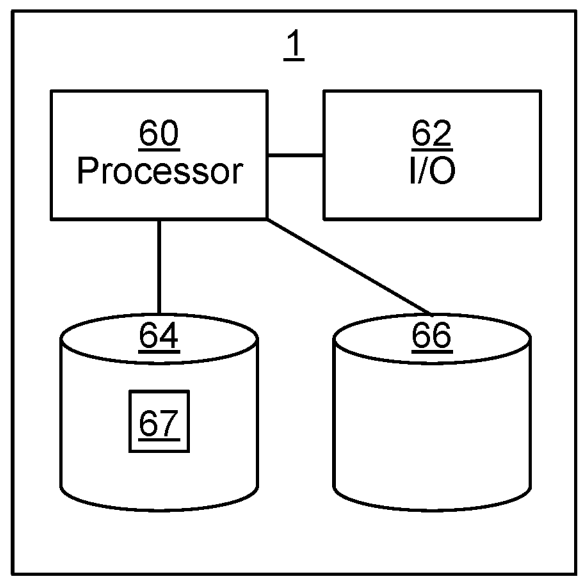
FIG. 5 is a schematic diagram illustrating components of the user analysis device of FIGS. 2A-C.

FIG. 5 is a schematic diagram illustrating components of the user analysis device 1 of FIGS. 2A-C. It is to be noted that when the user analysis device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The user analysis device 1 further comprises an I/O interface 62 for communicating with external and/or internal entities. Optionally, the I/O interface 62 also includes a user interface.

Other components of the user analysis device are omitted in order not to obscure the concepts presented herein.

Figure 6:
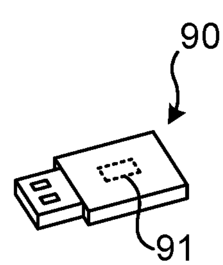
FIG. 6 shows one example of a computer program product comprising computer readable means.

FIG. 6 shows one example of a computer program product 90 comprising computer readable means. On this computer readable means, a computer program 91 can be stored in a non-transitory memory. The computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for alerting difference in user sentiment of a user using a door, the method being performed in a user analysis device, the method comprising:

- receiving sensor data from at least two sensors of different sensor types, the sensor data comprising data relating to a user in the vicinity of a door;
- determining, based on the sensor data, a first user sentiment prior to using the door;
- determining, based on the sensor data, a second user sentiment after using the door;
- deriving a difference in user sentiment between the first user sentiment and the second user sentiment, which comprises calculating an average difference of a sliding window function applied to user sentiment differences for users using the door;
- detecting that the difference in user sentiment is greater than a threshold; and
- generating an alert signal, indicating that the difference in user sentiment is greater than the threshold.

2. The method according to claim 1, wherein the first and second user sentiments are each represented by a plurality of sentiment scores, wherein each sentiment score indicates an estimated extent of a particular emotion of the user.

3. The method according to claim 1, wherein the detecting that the difference in user sentiment is greater than the threshold comprises comparing the difference in user sentiment to a baseline difference in user sentiment.

4. The method according to claim 1, wherein the sensor data comprises at least two of: image data from a camera, audio data from a microphone, or depth imaging data.

5. The method according to claim 1, further comprising balancing, based on the alert signal, a door kinematic operation between limiting door opening to save energy and extending door opening for improved user experience.

6. The method according to claim 1, wherein the alert signal indicates a need for reparation or maintenance of the door.

7. A user analysis device for alerting difference in user sentiment of a user using a door, the user analysis device comprising:

- a processor; and
- a memory storing instructions that, when executed by the processor, cause the user analysis device to:
  - receive sensor data from at least two sensors of different sensor types, the sensor data comprising data relating to a user in the vicinity of a door;
  - determine, based on the sensor data, a first user sentiment prior to using the door;
  - determine, based on the sensor data, a second user sentiment after using the door;
  - derive a difference in user sentiment between the first user sentiment and the second user sentiment, which comprises calculating an average difference of a sliding window function applied to user sentiment differences for users using the door;
  - detect that the difference in user sentiment is greater than a threshold; and
  - generate an alert signal, indicating that the difference in user sentiment is greater than the threshold.

8. The user analysis device according to claim 7, wherein the first and second user sentiments are each represented by a plurality of sentiment scores, wherein each sentiment score indicates an estimated extent of a particular emotion of the user.

9. The user analysis device according to claim 7, wherein the instructions to detect that the difference in user sentiment is greater than the threshold comprise instructions that, when executed by the processor, cause the user analysis device to compare the difference in user sentiment to a baseline difference in user sentiment.

10. The user analysis device according to claim 7, wherein the sensor data comprises at least two of: image data from a camera, audio data from a microphone, or depth imaging data.

11. The user analysis device according to claim 7, further comprising instructions that, when executed by the processor, cause the user analysis device to balance, based on the alert signal, a door kinematic operation between limiting door opening to save energy and extending door opening for improved user experience.

12. The user analysis device according to claim 7, wherein the alert signal indicates a need for reparation or maintenance of the door.

13. A non-transitory computer readable medium storing a computer program for alerting difference in user sentiment of a user using a door, the computer program comprising computer program code which, when executed on a user analysis device, causes the user analysis device to:

receive sensor data from at least two sensors of different sensor types, the sensor data comprising data relating to a user in the vicinity of a door;

determine, based on the sensor data, a first user sentiment prior to using the door;

determine, based on the sensor data, a second user sentiment after using the door;

derive a difference in user sentiment between the first user sentiment and the second user sentiment, which comprises calculating an average difference of a sliding window function applied to user sentiment differences for users using the door;

detect that the difference in user sentiment is greater than a threshold; and generate an alert signal, indicating that the difference in user sentiment is greater than the threshold.

* * * * *